(12) United States Patent
Staubli et al.

(10) Patent No.: US 8,330,321 B2
(45) Date of Patent: Dec. 11, 2012

(54) TURBOGENERATOR

(75) Inventors: Markus Staubli, Dottikon (CH); Reinhard Joho, Rombach (CH); Ralf Rotzinger, Murg-Niederhof (DE)

(73) Assignee: ALSTOM Technology Ltd., Baden (CH)

( * ) Notice: Subject to any disclaimer, the term of this patent is extended or adjusted under 35 U.S.C. 154(b) by 0 days.

(21) Appl. No.: 12/512,304

(22) Filed: Jul. 30, 2009

(65) Prior Publication Data

US 2010/0117472 A1    May 13, 2010

Related U.S. Application Data

(63) Continuation of application No. PCT/EP2008/050755, filed on Jan. 23, 2008.

(30) Foreign Application Priority Data

Feb. 5, 2007   (CH) ..................................... 0186/07

(51) Int. Cl.
*H02K 21/12* (2006.01)
(52) U.S. Cl. .............................. 310/261.1; 310/216.111
(58) Field of Classification Search ................ 310/261.1, 310/211, 156.28, 156.29, 216.111
See application file for complete search history.

(56) References Cited

U.S. PATENT DOCUMENTS

| | | | |
|---|---|---|---|
| 3,651,357 A | | 3/1972 | Richardson |
| 3,694,906 A | * | 10/1972 | Rank et al. ....................... 29/598 |
| 3,793,546 A | * | 2/1974 | King, Jr. ........................ 310/183 |
| 3,812,392 A | | 5/1974 | Barton et al. |
| 4,152,611 A | | 5/1979 | Madsen |
| 4,316,113 A | | 2/1982 | Sato et al. |
| 4,490,638 A | * | 12/1984 | Lind .............................. 310/269 |
| 5,536,985 A | * | 7/1996 | Ward et al. ...................... 310/44 |
| 5,936,324 A | * | 8/1999 | Montagu .................... 310/156.11 |
| 6,047,461 A | * | 4/2000 | Miura et al. ..................... 29/598 |
| 6,157,109 A | * | 12/2000 | Schiferl et al. .......... 310/216.019 |

(Continued)

FOREIGN PATENT DOCUMENTS

CH    150099    12/1931

(Continued)

OTHER PUBLICATIONS

Search Report for Swiss Patent App. No. 0186/2007 (Jul. 23, 2007).

(Continued)

*Primary Examiner* — Dang Le
(74) *Attorney, Agent, or Firm* — Cermak Nakajima LLP; Adam J. Cermak

(57) ABSTRACT

A turbogenerator (10) has a rotor (11) having a cylindrical rotor body (13), which at each of the two ends merges into a shaft end (14), and in a middle section has the electromagnetically active region (23) of the rotor (11), in which the rotor (11) is assembled from a plurality of rotor parts which are interconnected and arranged in series on the rotor axis (19). With such a rotor, lower losses and temperatures in the end region of the rotor, and overall a higher limit rating or a broadened output range, become possible as a result of the fact that the rotor body (13) in the active region (23) is formed of an easily magnetizable material, especially a first steel, and in that the end sections of the rotor body (13) which are located outside the active region (23) and the shaft ends (14) are formed of a material with reduced magnetizability or of a non-magnetic material, especially a second steel.

8 Claims, 1 Drawing Sheet

U.S. PATENT DOCUMENTS

| | | | |
|---|---|---|---|
| 6,429,566 B1 * | 8/2002 | Kuwahara | 310/156.56 |
| 2005/0062353 A1 * | 3/2005 | Brown | 310/156.11 |

FOREIGN PATENT DOCUMENTS

| | | |
|---|---|---|
| DE | 567854 | 1/1934 |
| EP | 1209802 | 5/2002 |
| EP | 1261117 | 11/2002 |
| EP | 1355405 | 10/2003 |
| FR | 716437 | 12/1931 |
| FR | 2057147 | 5/1971 |
| GB | 2378586 | 2/2003 |
| JP | 58063046 | 4/1983 |
| SU | 1451804 | 1/1989 |
| WO | WO99/14839 | 3/1999 |
| WO | WO2008/095779 | 8/2008 |

OTHER PUBLICATIONS

International Search Report for PCT Patent App. No. PCT/EP2008/050755 (Jun. 5, 2008).

* cited by examiner

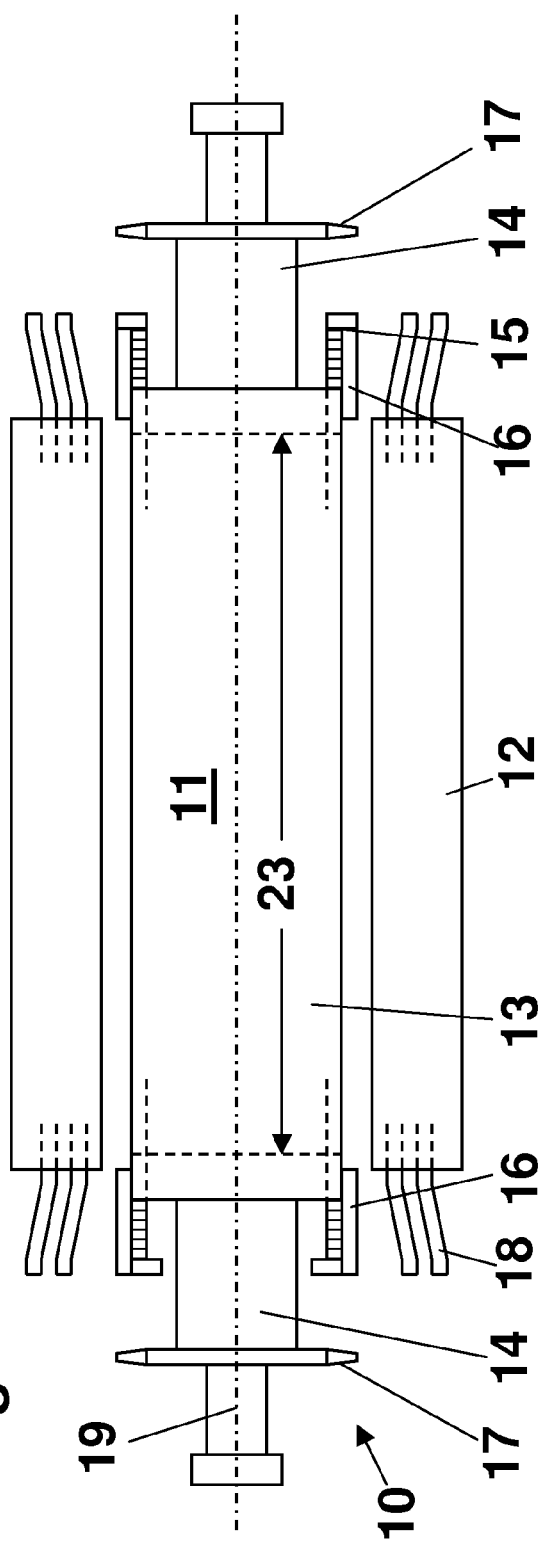
Fig.1
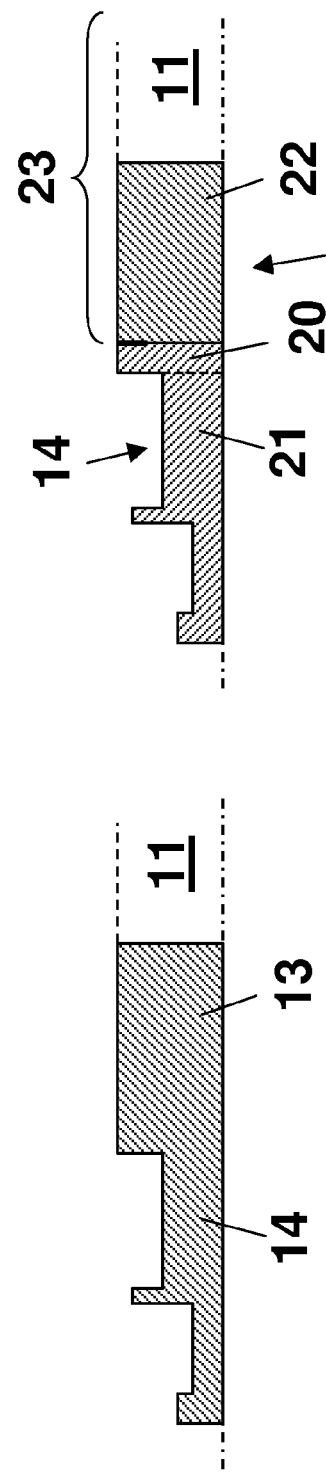
Fig.2
Fig.3

TURBOGENERATOR

This application is a Continuation of, and claims priority under 35 U.S.C. §120 to, International application no. PCT/EP2008/050755, filed 23 Jan. 2008, and claims priority therethrough under 35 U.S.C. §§119, 365 to Swiss application no. 00186/07, filed 5 Feb. 2007, the entireties of which are incorporated by reference herein.

BACKGROUND

1. Field of Endeavor

The present invention relates to the field of rotating electric machines, and more particularly to a turbogenerator.

2. Brief Description of the Related Art

Turbogenerators are known, for example from EP-A2-1 209 802. They include a rotor which is rotatably mounted around a rotor axis and concentrically enclosed by a stator. A direct current-fed rotor winding is accommodated in the rotor and is in electromagnetic interaction with an alternating-current stator winding in the stator. The rotors of the turbogenerators are produced from magnetizable ferritic steels. In most cases, these rotors are produced from a rough forging, which is created as a monobloc, by corresponding machining. It is also conceivable, however, in the case of large turbogenerators, to assemble the rotor from a plurality of rotor parts, as is described, for example, in publications CH-A-150 099 and DE-PS-567 854. The rotor can be divided along the axis into a central rotor body and shaft ends which adjoin the ends of the rotor body and with which the rotor is rotatably mounted in corresponding rotor bearings. The middle region of the rotor body is the (electromagnetically) active region of the rotor.

Also, in the case of built rotors or rotors which are assembled from a plurality of parts, the rotor, on account of the same material being used for all the rotor parts, has the same magnetic properties throughout, which then leads to unfavorable electromagnetic conditions in the region of the body end of the rotor body or in the region of the shrink fit of the rotor end caps which are arranged on the end of the rotor body, which electromagnetic conditions manifest themselves in increased eddy-current losses and in an increased temperature loading.

SUMMARY

One of numerous aspects of the present invention includes a rotor or turbogenerator which can avoid the aforementioned disadvantages of known rotors or turbogenerators, and which can be characterized by lower losses and temperatures in the end region of the rotor and overall by a higher limit rating or a broader output range.

Another aspect of the present invention includes that the rotor body in the active region is formed of an easily magnetizable material, especially a first steel, and that the end sections of the rotor body which are located outside the active region and the shaft ends which adjoin the body are formed of a material with reduced magnetizability or a non-magnetic material, especially a second, for example austenitic, steel.

Another aspect includes that the rotor body in the active region comprises one or more forged piece(s), in that the end sections of the rotor body which are located outside the active region and the shaft ends comprise one or more forged piece(s), and in that the magnetically different forged pieces are interconnected in a materially-bonding manner by a fusion-welding process. Alternatively to this, the different forged pieces can also be interconnected in a form-fitting or non-positive manner. Instead of the forged pieces, parts which are powder-metallurgically produced can also be used and are also interconnected in a materially-bonding or form-fitting or non-positive manner. Any combinations of forged pieces and powder-metallurgically produced pieces are also conceivable for the rotor.

Another aspect includes that a rotor end cap is shrunk on the rotor body on the ends in each case, and the rotor end caps are shrunk on in the region of the end sections of the rotor body.

BRIEF DESCRIPTION OF THE DRAWINGS

The invention is to be subsequently explained in more detail based on exemplary embodiments in conjunction with the drawing. In the drawing, FIG. 1 shows, in a greatly simplified view, the longitudinal section through a turbogenerator, as is suitable for the realization of the invention;

FIG. 2 shows the one end region of the rotor from FIG. 1 for the known case that the entire rotor is formed of a single magnetizable material; and FIG. 3 shows, in a view which is comparable to FIG. 2, the end region of a rotor according to an exemplary embodiment of the invention.

DETAILED DESCRIPTION OF EXEMPLARY EMBODIMENTS

In FIG. 1, in a greatly simplified view, the longitudinal section through a turbogenerator, as is suitable for the realization of the invention, is reproduced. The turbogenerator 10 includes a rotor 11 which is rotatably mounted around an axis 19 and a stator 12 which concentrically encloses the rotor 11. Both rotor and stator in their turn are enclosed by a casing which, for the sake of simplicity, is omitted in FIG. 1. The rotor 11 has a cylindrical rotor body 13 as a central section, the middle part (section between the dashed lines in FIG. 1) of which as an active region 23 effects the electromagnetic interaction with the stator 12. For this purpose, a rotor winding 15 is accommodated in the rotor 11 and a stator winding 18 is accommodated in the stator 13, which windings include winding conductors which in a known manner are laid in corresponding slots. Overhang turns are formed on the end faces of the rotor body 13 and of the stator 12. The overhang turns on the rotor body 13 are retained and protected by rotor end caps 16 which are shrunk onto the rotor body 13 at the ends.

At the ends, the rotor body 13 merges into a shaft end 14 in each case. Fans 17 are customarily arranged in the region of the shaft ends 14 for circulating a gaseous cooling medium. By the shaft ends 14, the rotor 11 is rotatably mounted in corresponding bearings. At the same time, the shaft ends 14 serve for the connection to driving turbomachines, such as gas turbines.

According to principles of the invention, the rotor 11, as shown in FIG. 3, is not formed of a single material with the same magnetic properties throughout, that is to say for example from an easily magnetizable steel, but is formed of at least two materials with different magnetic properties. The rotor 11, as exemplarily shown in FIG. 3, is formed as a rotor which is built or assembled from rotor parts 21, 22 and in the active region 23 includes forged pieces with good magnetizability, and in the end regions of the rotor body 13 (body sections 20, cap seats of the rotor end caps 16) and in the shaft ends 14 includes forged pieces with reduced magnetizability, or from a non-magnetic material, for example from an austenitic steel. These sorts of materials are generally known to the person skilled in the art. The assembling of the magnetically different forged pieces is carried out in this case preferably by a fusion-welding process, but can also be carried out by threaded connections or the like. It is self-evident in this case that the rotor parts 21, 22 in their turn can each include one piece or can each also be assembled from a plurality of pieces. The active region 23 of the rotor is advantageously not identical to that of the stator 12, but advantageously is somewhat smaller than the stator, as is indicated in FIG. 1.

Of course, the invention is not limited to the described exemplary embodiment.

Instead of the forged pieces which are described above, powder-metallurgically produced parts can be used, which are also interconnected in a materially-bonding manner or in a form-fitting and non-positive manner. Any combinations of forged pieces and powder-metallurgically produced pieces are also conceivable for the rotor, wherein in the active region 23 of the rotor body 13 forged pieces or powder-metallurgically produced pieces formed of materials with good magnetizability are used, and in the end regions of the rotor body 13 (body sections 20, cap seats of the rotor end caps 16) and in the shaft ends 14 forged pieces or powder-metallurgically produced pieces formed of materials with reduced magnetizability or of a non-magnetic material are used.

The powder-metallurgically produced pieces preferably are formed of a powder-metallurgically produced steel, but can also be powder-metallurgically produced superalloys.

As a result of the splitting of the rotor according to principles of the present invention into sections with different magnetic properties, the magnetic end fields of the rotor and of the stator are influenced. The following characteristics and advantages result in this case:

- The field which penetrates the cap seat, and always has a certain alternating component, is reduced. There are therefore fewer electrical eddy-current losses in the rotor end cap seat.
- The end of the stator is unloaded to a high degree with regard to the axially entering field. Fewer eddy-current losses in the stator lamination in yoke and tooth result from this.
- The stator winding conductors are unloaded in the region of the stator ends with regard to the permeating field. Fewer eddy-current losses in the stator winding conductor result from this.
- The non-magnetic body material at the rotor end, therefore carrying current over a large area in cross section, can serve for electrically-conducting connection to the continuous damper wedges.
- The local losses and temperatures in the end region become smaller.
- A higher limit rating or a broadened output range is possible.

LIST OF DESIGNATIONS

10 Turbogenerator
11 Rotor
12 Stator
13 Rotor body
14 Shaft end
15 Rotor winding
16 Rotor end cap
17 Fan
18 Stator winding
19 Axis
20 Body section
21, 22 Rotor part
23 Active region (rotor body)

While the invention has been described in detail with reference to exemplary embodiments thereof, it will be apparent to one skilled in the art that various changes can be made, and equivalents employed, without departing from the scope of the invention. The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments as are suited to the particular use contemplated. It is intended that the scope of the invention be defined by the claims appended hereto, and their equivalents. The entirety of each of the aforementioned documents is incorporated by reference herein.

We claim:

1. A turbogenerator comprising:
a rotor and a stator, wherein the rotor comprises
a cylindrical rotor body formed of at least one non-laminated, forged, and/or powder-metallurgically-produced piece and having two end sections ending at shaft ends and defining a rotor axis, and a middle section including an electromagnetically active region of the rotor;
wherein the rotor body comprises a plurality of separate rotor parts joined together and arranged in series on the rotor axis;
wherein the rotor body in the active region is formed of a first material which is easily magnetizable during operation of the turbogenerator, and the end sections of the rotor body located outside the active region and the shaft ends are formed of a second material with reduced magnetizability or of a non-magnetic material; and
wherein the rotor end sections are at least partially outside of the stator.

2. A turbogenerator rotor comprising:
a cylindrical rotor body formed of at least one non-laminated, forged, and/or powder-metallurgically-produced piece and having two end sections ending at shaft ends and defining a rotor axis, and a middle section including an electromagnetically active region of the rotor;
wherein the rotor body comprises a plurality of separate rotor parts joined together and arranged in series on the rotor axis; and
wherein the rotor body in the active region is formed of a first, easily magnetizable material, and the end sections of the rotor body located outside the active region and the shaft ends are formed of a second material with reduced magnetizability or of a non-magnetic material;
wherein the rotor body in the active region comprises at least one powder-metallurgically produced piece;
wherein the end sections located outside the active region and the shaft ends comprise at least one powder-metallurgically produced piece; and
wherein the different powder-metallurgically produced pieces are interconnected in either
a materially-bonding manner by fusion-welding, or
a form-fitting and non-positive manner.

3. A turbogenerator rotor comprising:
a cylindrical rotor body formed of at least one non-laminated, forged, and/or powder-metallurgically-produced piece and having two end sections ending at shaft ends and defining a rotor axis, and a middle section including an electromagnetically active region of the rotor;

wherein the rotor body comprises a plurality of separate rotor parts joined together and arranged in series on the rotor axis; and wherein the rotor body in the active region is formed of a first material which is easily magnetizable during operation of the turbogenerator, and the end sections of the rotor body located outside the active region and the shaft ends are formed of a second material with reduced magnetizability or of a non-magnetic material.

4. The turbogenerator rotor as claimed in claim 3, wherein the first material comprises a first steel, and wherein the second material comprises a second, different steel.

5. The turbogenerator rotor as claimed in claim 3, wherein:
the rotor body active region comprises at least one forged piece;
the end sections outside the active region and the shaft ends comprise at least one forged piece; and
the different forged pieces are interconnected in a materially-bonding manner by fusion-welding.

6. The turbogenerator rotor as claimed in claim 3, wherein:
the rotor body in the active region comprises at least one forged piece;
the end sections located outside the active region and the shaft ends comprise at least one forged piece; and
the different forged pieces are interconnected in a form-fitting and non-positive manner.

7. The turbogenerator rotor as claimed in claim 3, wherein the rotor body and the shaft ends each comprise at least one powder-metallurgically produced piece or forged piece.

8. The turbogenerator rotor as claimed in claim 3, further comprising:
rotor end caps shrunk onto the rotor body ends in the region of the end sections.

* * * * *